US012679197B2

(12) United States Patent (10) Patent No.: US 12,679,197 B2
Nishimura et al. (45) Date of Patent: Jul. 14, 2026

(54) COOLING SYSTEM

(71) Applicant: ISUZU MOTORS LIMITED,
Yokohama (JP)

(72) Inventors: Ryoma Nishimura, Fujisawa (JP);
Kota Kato, Fujisawa (JP)

(73) Assignee: ISUZU MOTORS LIMITED,
Yokohama (JP)

( * ) Notice: Subject to any disclaimer, the term of this
patent is extended or adjusted under 35
U.S.C. 154(b) by 379 days.

(21) Appl. No.: 18/473,349

(22) Filed: Sep. 25, 2023

(65) Prior Publication Data

US 2024/0100937 A1 Mar. 28, 2024

(30) Foreign Application Priority Data

Sep. 27, 2022 (JP) ................................. 2022-153496

(51) Int. Cl.
*B60K 11/02* (2006.01)
*B60S 1/50* (2006.01)

(52) U.S. Cl.
CPC ................. *B60K 11/02* (2013.01); *B60S 1/50*
(2013.01)

(58) Field of Classification Search
CPC . B60K 11/02; B60S 1/48; B60S 1/487; B60S
1/488; B60S 1/50
See application file for complete search history.

(56) References Cited

U.S. PATENT DOCUMENTS

| | | | | | |
|---|---|---|---|---|---|
| 2018/0162327 A1* | 6/2018 | Lansinger | ............... | F24H 1/009 |
| 2021/0057964 A1* | 2/2021 | Kiyomihara | ........... | H02K 11/05 |
| 2024/0100937 A1* | 3/2024 | Nishimura | .............. | B60L 1/003 |

FOREIGN PATENT DOCUMENTS

| | | | | | |
|---|---|---|---|---|---|
| AT | 413365 B | * | 2/2006 | ............. | B60K 11/02 |
| CN | 201779825 U | | 3/2011 | | |
| CN | 202759617 | * | 2/2013 | | |
| CN | 202759617 U | | 2/2013 | | |
| DE | 1430419 A1 | | 7/1969 | | |
| EP | 3715192 A1 | * | 9/2020 | ............. | B60S 1/481 |
| EP | 3715192 A2 | | 9/2020 | | |
| JP | 56-043451 U | | 4/1981 | | |
| JP | S5643451 U | * | 4/1981 | | |
| JP | 2016-098650 A | | 5/2016 | | |
| JP | 2021-030811 A | | 3/2021 | | |

OTHER PUBLICATIONS

Translation of AT-413365-B (Year: 2006).*

* cited by examiner

*Primary Examiner* — Katy M Ebner
(74) *Attorney, Agent, or Firm* — Shih IP Law Group,
PLLC

(57) ABSTRACT

A cooling system mounted in a vehicle includes a motor that
is a drive source of the vehicle; an inverter that drives the
motor; a radiator; a washer liquid tank that stores a cleaning
liquid for cleaning a windshield of the vehicle; and a
circulation channel that allows the cleaning liquid stored in
the washer liquid tank to circulate through the inverter, the
motor, the radiator, and the washer liquid tank in an order
presented, thereby causing the cleaning liquid to store heat
of the motor and the inverter and also causing heat of the
cleaning liquid to be dissipated by the radiator.

4 Claims, 4 Drawing Sheets

COOLING SYSTEM

CROSS REFERENCE TO RELATED APPLICATIONS

This application is entitled to the benefit of Japanese Patent Application No. 2022-153496, filed on Sep. 27, 2022, the disclosure of which including the specification, drawings and abstract is incorporated herein by reference in its entirety.

TECHNICAL FIELD

The present disclosure relates to a cooling system mounted in a vehicle.

BACKGROUND ART

Conventional Electric Vehicles (EVs) and Hybrid Electric Vehicles (HEVs) include a water-cooling cooling circuit to cool a mounted motor and a mounted inverter. In particular, the HEVs include a cooling circuit for cooling the motor and the inverter, separately from a cooling circuit for cooling an engine (for example, see Patent Literature (hereinafter, referred to as "PTL") 1).

The cooling circuit for cooling the motor and the inverter includes a reserve tank, a pump for pumping coolant stored in the reserve tank, and a radiator for cooling the coolant heated after the coolant is pumped by the pump and cools (performs heat exchange on) the inverter and the motor. The cooling circuit for cooling the motor and the inverter is mounted in an engine room in the case of a passenger car, and in a chassis portion in the case of a commercial car.

CITATION LIST

Patent Literature

PTL 1: Japanese Patent Application Laid-Open No. 2016-98650

SUMMARY OF INVENTION

Technical Problem

However, in the conventional cooling circuit, it is not preferable that the reserve tank occupies a space from the viewpoint of effective use of the space.

An object of the present disclosure is to provide a cooling system capable of saving space, saving time and effort for replacing coolant, and also capable of improving a cleaning action by a cleaning liquid.

Solution to Problem

A cooling system according to the present disclosure is a cooling system mounted in a vehicle, the cooling system including: a motor that is a drive source of the vehicle; an inverter that drives the motor; a radiator; a storage tank that stores a cleaning liquid for cleaning a windshield of the vehicle; and a circulation channel that allows the cleaning liquid stored in the storage tank to circulate through the inverter, the motor, the radiator, and the storage tank in an order presented, thereby causing the cleaning liquid to store heat of the motor and the inverter and also causing heat of the cleaning liquid to be dissipated by the radiator.

Advantageous Effects of Invention

According to the present disclosure, it is possible to save space, to save time and effort for replacing coolant, and to improve the cleaning action by a cleaning liquid.

DESCRIPTION OF EMBODIMENTS

Hereinafter, embodiments of the present disclosure will be described in detail with reference to the drawings. However, the embodiment described below is an example, and is not limited to this embodiment. For example, detailed descriptions of already well-known matters, repeated descriptions for substantially the same configuration, and/or the like may be omitted.

Embodiment 1

<Configuration of Cooling System>

Figure 1:
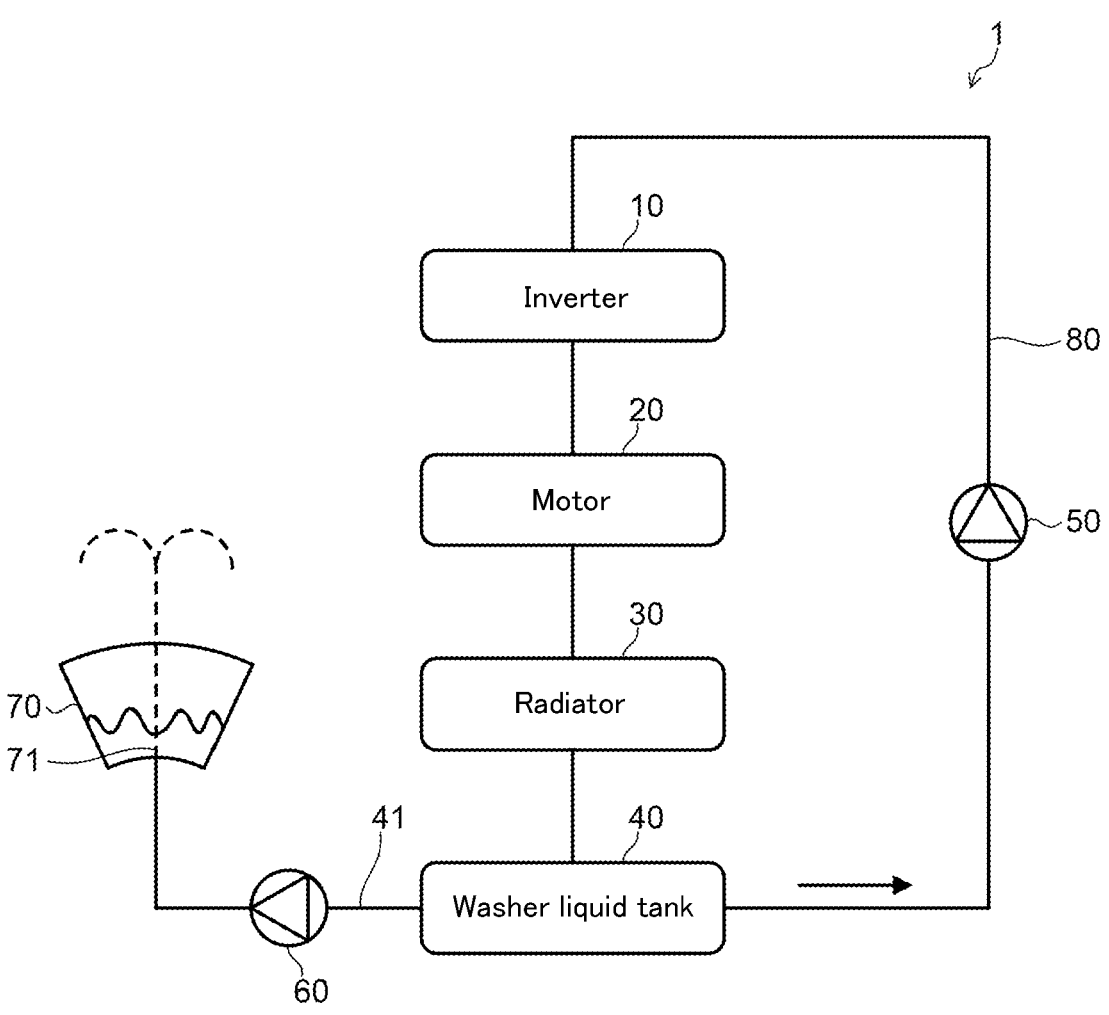
FIG. 1 is a block diagram illustrating a configuration of a cooling system according to Embodiment 1 of the present disclosure.
Figure 2:
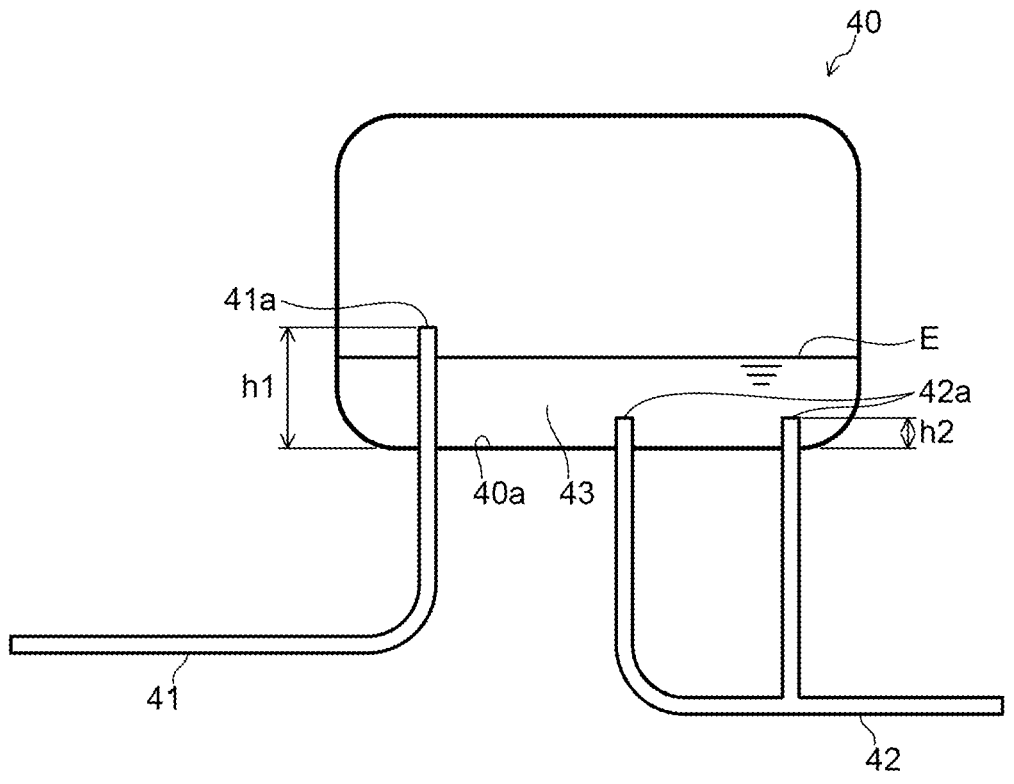
FIG. 2 is a schematic diagram illustrating the configuration of a part of the cooling system according to Embodiment 1 of the present disclosure.

To begin with, a configuration of cooling system 1 according to Embodiment 1 of the present disclosure will be described with reference to FIGS. 1 and 2. FIG. 1 is a block diagram illustrating the configuration of cooling system 1 according to the present embodiment. FIG. 2 is a schematic diagram illustrating a part of the configuration of cooling system 1 according to the present embodiment.

Cooling system 1 is mounted in an EV or a HEV, and includes inverter 10, motor 20, radiator 30, washer liquid tank 40, intake section 41, pump 50, and pump 60.

Inverter 10 converts direct-current (DC) power of a battery (not illustrated) into three-phase alternate-current (AC) power and supplies the three-phase AC power to motor 20, so as to drive motor 20.

Motor 20 is a driving source of a vehicle that is driven by being supplied with the three-phase AC power from inverter 10. By being driven, motor 20 drives front wheels or rear wheels (both of which are not illustrated) of the vehicle.

Radiator 30 cools cleaning liquid 43 passing through radiator 30 by performing heat exchange between cleaning liquid 43 passing through radiator 30 and the air (wind caused during traveling) passing through radiator 30.

Washer liquid tank 40 is a storage tank storing cleaning liquid 43 for cleaning windshield 70 of the vehicle.

Intake section 41 is a channel for cleaning liquid 43 that is configured to discharge cleaning liquid 43 stored in washer liquid tank 40 toward windshield 70 of the vehicle. Intake port 41a is disposed in one end of intake section 41. Intake port 41a is disposed in washer liquid tank 40, and takes cleaning liquid 43 from washer liquid tank 40 into intake section 41 when windshield 70 of the vehicle is cleaned. At the other end of intake section 41, discharge port 71 for discharging, toward windshield 70 of the vehicle, cleaning liquid 43 taken into intake section 41 from intake port 41a.

Pump 50 pumps cleaning liquid 43 stored in washer liquid tank 40 toward inverter 10.

Pump 60 is disposed in intake section 41, takes in cleaning liquid 43 stored in washer liquid tank 40 from intake port 41a, pumps the cleaning liquid to discharge port 71, and discharges the cleaning liquid toward windshield 70 of the vehicle through discharge port 71 to clean windshield 70.

Circulation channel 80 allows cleaning liquid 43 stored in washer liquid tank 40 to circulate through inverter 10, motor 20, radiator 30, and washer liquid tank 40 in this order. Supply ports 42a for supplying cleaning liquid 43 stored in washer liquid tank 40 to circulation channel 80 are disposed in washer liquid tank 40. A plurality of supply ports 42a are disposed in washer liquid tank 40.

Height h1 of intake port 41a from inner bottom surface 40a of washer liquid tank 40 is higher than height h1 of supply ports 42a from inner bottom surface 40a (h1>h2).

<Operation of Cooling System>

The operation of cooling system 1 according to Embodiment 1 of the present disclosure will be described with reference to FIGS. 1 and 2.

To begin with, washer liquid tank 40 stores cleaning liquid 43 with which a user replenished the liquid tank.

When an ignition switch of a vehicle (not illustrated) is turned on, pump 50 starts to be driven under the control of an Electronic Control Unit (ECU) (not illustrated). When pump 50 is driven, cleaning liquid 43 stored in washer liquid tank 40 circulates through circulation channel 80.

Specifically, cleaning liquid 43 stored in washer liquid tank 40 is supplied through supply ports 42a to circulation channel 80 by pump 50 that has started to be driven, and is pumped to inverter 10.

Cleaning liquid 43 pumped to inverter 10 stores heat generated in inverter 10, and then pumped to motor 20 to store heat generated in motor 20.

Cleaning liquid 43 storing the heat generated in motor 20 is cooled by exchanging the heat in radiator 30 with the air (wind caused during travelling) passing through radiator 30.

Cleaning liquid 43 cooled in radiator 30 is returned to washer liquid tank 40 and stored therein.

Further, when pump 60 is driven by a user's operation, cleaning liquid 43 stored in washer liquid tank 40 is taken through intake port 41a into intake section 41, is pumped toward discharge port 71, and is discharged from discharge port 71 toward windshield 70 of the vehicle. Thus, windshield 70 can be cleaned by cleaning liquid 43.

In the above-described operation, when cleaning liquid 43 stored in washer liquid tank 40 is used for cleaning windshield 70, cleaning liquid 43 stored in washer liquid tank 40 is reduced. In this case, when height E of the liquid level of cleaning liquid 43 stored in washer liquid tank 40 from inner bottom surface 40a of washer liquid tank 40 becomes lower than intake port 41a as illustrated in FIG. 2, cleaning liquid 43 cannot be taken in from intake port 41a.

However, even in this case, it is possible to supply the cleaning liquid from supply ports 42a to circulation channel 80 by making height h2 of supply ports 42a from inner bottom surface 40a lower than height h1 of intake port 41a from inner bottom surface 40a. Further, when height E of the liquid level of cleaning liquid 43 stored in washer liquid tank 40 from inner bottom surface 40a becomes lower than intake port 41a, notification to the user using an alarm or the like and subsequent replenishment of washer liquid tank 40 with cleaning liquid 43 by the user make it possible to prevent impossibility of supplying cleaning liquid 43 to circulation channel 80.

Further, by disposing a plurality of supply ports 42a in washer liquid tank 40, it is possible to reliably supply cleaning liquid 43 to circulation channel 80 even when height E of the liquid level of cleaning liquid 43 from inner bottom surface 40a fluctuates due to vibration or the like of the vehicle.

Further, since the temperature of the coolant in cooling system 1 for cooling motor 20 and inverter 10 is lower than in a cooling system for cooling an engine, it is not necessary to add an additive for preventing boiling to the coolant. Thus, cleaning liquid 43 can be used as the coolant as it is. In addition, since an antifreeze solution is used as cleaning liquid 43, it is possible to prevent the cleaning liquid from being frozen when the cleaning liquid is used as the coolant for cooling motor 20 and inverter 10.

As described above, in the present embodiment, cleaning liquid 43 stored in washer liquid tank 40 is circulated through inverter 10, motor 20, radiator 30, and washer liquid tank 40 in this order, whereby the heat of motor 20 and inverter 10 is stored in cleaning liquid 43 and the heat of cleaning liquid 43 is dissipated by radiator 30.

This eliminates the need for a reserve tank for storing the coolant for cooling motor 20 and inverter 10. It is thus possible to save space and eliminate an effort for replacing the coolant. Further, since cleaning liquid 43 is warmed by motor 20 and inverter 10, the cleaning action exerted by cleaning liquid 43 on an oil film or the like adhering to windshield 70 can be improved.

Embodiment 2

<Configuration of Cooling System>

Figure 3:
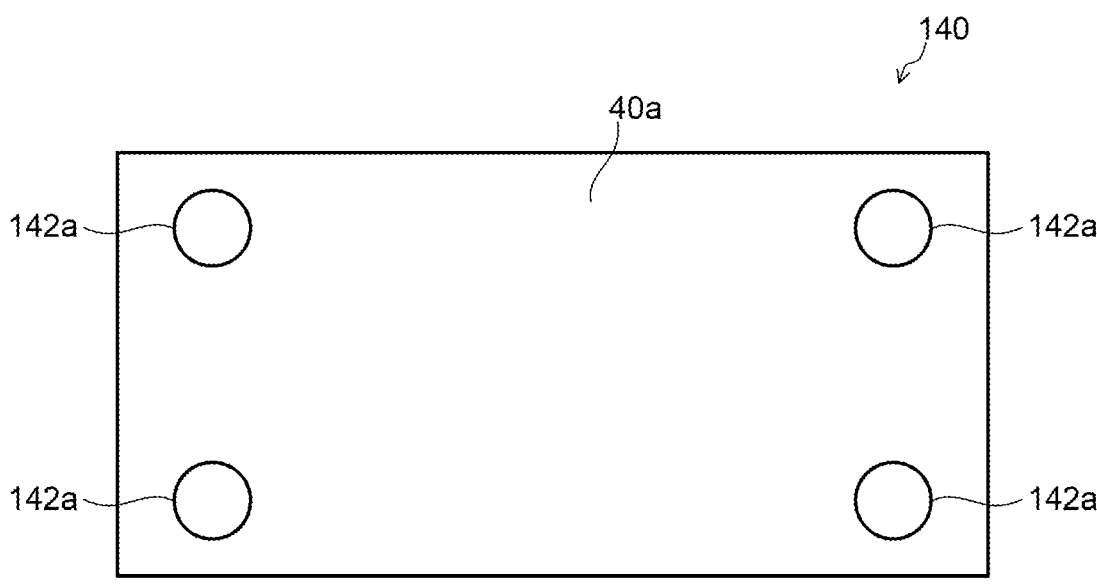
FIG. 3 is a schematic diagram illustrating a configuration of a part of a cooling system according to Embodiment 2 of the present disclosure.

To begin with, a configuration of a cooling system according to Embodiment 2 of the present disclosure will be described with reference to FIG. 3. FIG. 3 is a schematic diagram illustrating the configuration of a part of the cooling system according to Embodiment 2 of the present disclosure.

Since the configuration of the cooling system according to the present embodiment other than washer liquid tank 140 is the same as that of cooling system 1, a description of the same configuration will be omitted. In FIG. 3, the same components as those in FIG. 2 are denoted by the same reference numerals, and the description thereof will be omitted.

The cooling system according to the present embodiment is mounted in an EV or a HEV, and includes inverter 10, motor 20, radiator 30, intake section 41, pump 50, pump 60, and washer liquid tank 140. In FIG. 3, the illustration of intake port 41a is omitted.

Washer liquid tank 140 is a storage tank storing cleaning liquid 43 for cleaning windshield 70 of the vehicle.

Intake section 41 is a channel for cleaning liquid 43 that is configured to discharge cleaning liquid 43 stored in washer liquid tank 140 toward windshield 70 of the vehicle. Intake port 41a is disposed in washer liquid tank 140, and takes cleaning liquid 43 from washer liquid tank 140 into intake section 41 when windshield 70 of the vehicle is cleaned.

The height of intake port 41a from inner bottom surface 40a of washer liquid tank 140 is higher than the height of supply ports 142a from inner bottom surface 40a.

Pump 50 pumps cleaning liquid 43 stored in washer liquid tank 140 toward inverter 10.

Pump 60 is disposed in intake section 41, and takes in cleaning liquid 43 stored in washer liquid tank 40 through intake port 41*a*, and pumps the cleaning liquid toward discharge port 71, and discharges the cleaning liquid through discharge port 71 toward windshield 70 of the vehicle to clean windshield 70.

Circulation channel 80 allows cleaning liquid 43 stored in washer liquid tank 140 to circulate through inverter 10, motor 20, radiator 30, and washer liquid tank 40 in this order. Circulation channel 80 is provided with supply ports 142*a* for supplying cleaning liquid 43 stored in washer liquid tank 140 to circulation channel 80. A plurality of supply ports 142*a* are disposed in washer liquid tank 140 and are disposed at all corners of washer liquid tank 140. For example, when washer liquid tank 140 as seen from above as illustrated in FIG. 3 is rectangular, supply ports 142*a* are disposed at four corners of washer liquid tank 140.

By disposing supply ports 142*a* at the four corners, the cleaning liquid stored in washer liquid tank 40 can be supplied from supply ports 142*a* to circulation channel 80 even when the vehicle is inclined in any directions such as forward, rearward, leftward, or rightward.

Since the operation of the cooling system according to the present embodiment is the same as the operation of cooling system 1 according to Embodiment 1, the description thereof will be omitted.

As described above, according to the present embodiment, cleaning liquid 43 stored in washer liquid tank 140 is circulated through inverter 10, motor 20, radiator 30, and washer liquid tank 140 in this order. Accordingly, the heat of motor 20 and inverter 10 is stored in cleaning liquid 43, and the heat of cleaning liquid 43 is dissipated by radiator 30, whereby the same effects as those of above-described Embodiment 1 can be obtained.

Embodiment 3

<Configuration of Cooling System>

Figure 4:
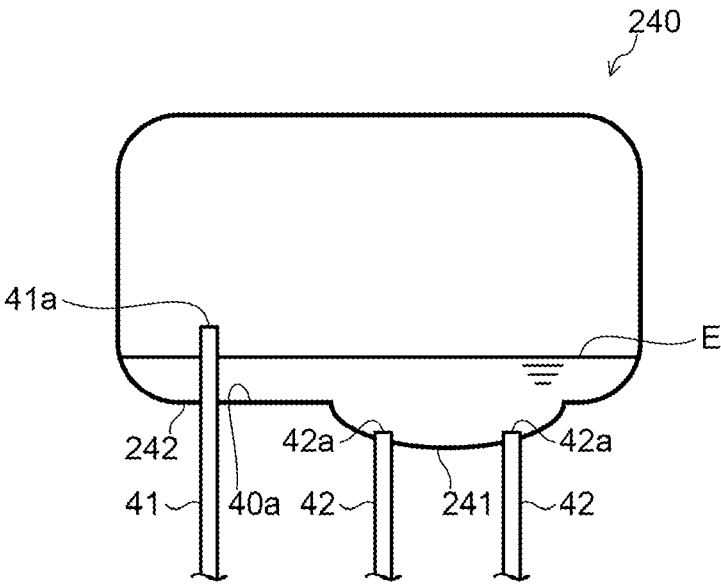
FIG. 4 is a schematic diagram illustrating a configuration of a part of a cooling system according to Embodiment 3 of the present disclosure.

To begin with, a configuration of a cooling system according to Embodiment 3 of the present disclosure will be described with reference to FIG. 4. FIG. 4 is a schematic diagram illustrating a configuration of a part of the cooling system according to Embodiment 3 of the present disclosure.

Since the configuration of the cooling system according to the present embodiment other than washer liquid tank 240 is the same as that of cooling system 1, a description thereof will be omitted. In FIG. 4, the same components as those in FIG. 2 are denoted by the same reference numerals, and the description thereof will be omitted.

The cooling system according to the present embodiment is mounted in an EV or a HEV, and includes inverter 10, motor 20, radiator 30, intake section 41, pump 50, pump 60, and washer liquid tank 240.

Washer liquid tank 240 is a storage tank storing cleaning liquid 43 for cleaning windshield 70 of the vehicle. Washer liquid tank 240 includes recessed portion 241 recessed in bottom wall 242.

Intake section 41 is a channel for cleaning liquid 43 that is configured to discharge cleaning liquid 43 stored in washer liquid tank 240 to windshield 70 of the vehicle. Intake port 41*a* is disposed in washer liquid tank 240 at a place other than recessed portion 241, and takes cleaning liquid 43 from washer liquid tank 240 into intake section 41 when windshield 70 of the vehicle is cleaned.

Pump 50 pumps cleaning liquid 43 stored in washer liquid tank 240 toward inverter 10.

Pump 60 is disposed in intake section 41, and takes in cleaning liquid 43 stored in washer liquid tank 240 through intake port 41*a*, and pumps the cleaning liquid toward discharge port 71, and discharges the cleaning liquid through discharge port 71 toward windshield 70 of the vehicle to clean windshield 70.

Circulation channel 80 allows cleaning liquid 43 stored in washer liquid tank 240 to circulate through inverter 10, motor 20, radiator 30, and washer liquid tank 240 in this order. Circulation channel 80 are provided with supply ports 42*a* for supplying cleaning liquid 43 stored in washer liquid tank 240 to circulation channel 80. A plurality of supply ports 42*a* are disposed in recessed portion 241 of washer liquid tank 240.

The height of intake port 41*a* is higher than the height of supply ports 42*a* in washer liquid tank 240.

Supply ports 42*a* are disposed in recessed portion 241. Accordingly, even when the vehicle is inclined in any directions such as forward, rearward, leftward, and rightward, cleaning liquid 43 is kept stored in recessed portion 241. Thus, the cleaning liquid stored in recessed portion 241 can be reliably supplied from supply ports 42*a* to circulation channel 80.

Since the operation of the cooling system according to the present embodiment is the same as the operation of cooling system 1 according to Embodiment 1, the description thereof will be omitted.

As described above, according to the present embodiment, cleaning liquid 43 stored in washer liquid tank 240 is circulated through inverter 10, motor 20, radiator 30, and washer liquid tank 240 in this order. Accordingly, the heat of motor 20 and inverter 10 is stored in cleaning liquid 43, and the heat of cleaning liquid 43 is dissipated by radiator 30, whereby the same effects as those of above-described Embodiment 1 can be obtained.

Note that the types, arrangements, numbers, and the like of members in the present disclosure are not limited to those in the above-described embodiments, and can naturally be changed appropriately without departing from the spirit of the invention. For example, it is possible to appropriately change a component of the present disclosure to another thing having the same effect.

Industrial Applicability

The present disclosure is suitable for a cooling system mounted in a vehicle.

The invention claimed is:

1. A cooling system mounted in a vehicle, the cooling system comprising:
   a motor that is a drive source of the vehicle;
   an inverter that drives the motor;
   a radiator;
   a storage tank that stores a cleaning liquid for cleaning a windshield of the vehicle;
   a circulation channel that allows the cleaning liquid stored in the storage tank to circulate through the inverter, the motor, the radiator, and the storage tank in an order presented, thereby causing the cleaning liquid to store heat of the motor and the inverter and also causing heat of the cleaning liquid to be dissipated by the radiator;
   an intake port disposed in the storage tank protruding from an inner bottom and configured to uptake the cleaning liquid from the storage tank when the windshield is cleaned; and a supply port disposed in the storage tank protruding from the inner bottom and configured to supply the cleaning liquid from the storage tank to the circulation channel, wherein a height of the intake port is higher than a height of the supply port.

2. The cooling system according to claim 1, wherein a plurality of supply ports are provided, and the height of the plurality of supply ports are substantially equal.

3. The cooling system according to claim 1, wherein the storage tank comprises a recessed portion recessed in a bottom wall, the intake port is disposed in the storage tank except in the recessed portion, and the supply port is disposed in the recessed portion.

4. The cooling system according to claim 1, wherein the plurality of supply ports are disposed at all corners of the storage tank.

\* \* \* \* \*